US010212121B2

(12) United States Patent
Pan et al.

(10) Patent No.: US 10,212,121 B2
(45) Date of Patent: Feb. 19, 2019

(54) INTELLIGENT SCHEDULING FOR EMPLOYEE ACTIVATION

(71) Applicant: Microsoft Technology Licensing, LLC, Redmond, WA (US)

(72) Inventors: Wayne Pan, San Jose, CA (US); Nicholas David Snyder, Belmont, CA (US); William Jayang Sun, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 14/880,917

(22) Filed: Oct. 12, 2015

(65) Prior Publication Data

US 2016/0149850 A1 May 26, 2016

Related U.S. Application Data

(60) Provisional application No. 62/083,847, filed on Nov. 24, 2014.

(51) Int. Cl.
*H04L 12/58* (2006.01)
*H04L 29/08* (2006.01)

(52) U.S. Cl.
CPC .............. *H04L 51/32* (2013.01); *H04L 51/26* (2013.01); *H04L 67/22* (2013.01); *H04L 67/306* (2013.01)

(58) Field of Classification Search
CPC ........ H04L 67/22; H04L 51/32; H04L 67/306
See application file for complete search history.

(56) References Cited

U.S. PATENT DOCUMENTS

| 8,700,710 | B1 | 4/2014 | Gallagher et al. |
| 9,247,015 | B2 | 1/2016 | Ruffner et al. |
| 9,268,818 | B1 | 2/2016 | Pattan et al. |
| 9,307,380 | B1 | 4/2016 | Smith et al. |
| 9,361,322 | B1 * | 6/2016 | Dutta ..................... G06Q 30/08 |
| 9,436,709 | B1 * | 9/2016 | Anima .............. G06F 17/30038 |
| 9,524,077 | B1 | 12/2016 | Pattan et al. |
| 9,654,535 | B2 * | 5/2017 | Nguyen ........... H04N 21/23103 |
| 9,756,008 | B2 | 9/2017 | Banatwala et al. |
| 9,762,686 | B2 * | 9/2017 | Smith ..................... H04L 67/22 |

(Continued)

OTHER PUBLICATIONS

"Applicant Initiated Interview Summary Issued in U.S. Appl. No. 14/880,959", dated May 1, 2018, 3 Pages.

(Continued)

*Primary Examiner* — Lashonda T Jacobs
(74) *Attorney, Agent, or Firm* — Schwegman Lundberg & Woessner, P.A.

(57) ABSTRACT

Techniques for intelligent scheduling of content sharing by company employees via an online social networking service are described. According to various embodiments, a request is received from a member of an online social networking service to share a content item among members in the member's connection network on the online social networking service. Member behavior log data associated with the members in the connection network of the member is then accessed. Thereafter, an optimum sharing time for sharing the content item among the members in the member's connection network is calculated. The content item is then caused to be shared at the optimum sharing time with the members in the member's connection network.

20 Claims, 11 Drawing Sheets

(56) References Cited

U.S. PATENT DOCUMENTS

| | | |
|---|---|---|
| 9,832,156 B2 | 11/2017 | Lai et al. |
| 2009/0215469 A1 | 8/2009 | Fisher et al. |
| 2011/0154209 A1 | 6/2011 | Fan et al. |
| 2011/0185020 A1 | 7/2011 | Ramamurthy et al. |
| 2012/0042013 A1 | 2/2012 | Roman et al. |
| 2012/0131103 A1 | 5/2012 | Fox |
| 2012/0159337 A1 | 6/2012 | Travilla et al. |
| 2012/0191776 A1 | 7/2012 | Ruffner et al. |
| 2012/0330701 A1 | 12/2012 | Hyder et al. |
| 2013/0159110 A1* | 6/2013 | Rajaram ............... G06Q 30/02 705/14.66 |
| 2013/0179802 A1 | 7/2013 | Martinazzi et al. |
| 2013/0204871 A1* | 8/2013 | Wong ............... G06F 17/30867 707/732 |
| 2013/0238697 A1 | 9/2013 | Mehta et al. |
| 2013/0254397 A1 | 9/2013 | Lai et al. |
| 2013/0275320 A1 | 10/2013 | Moore et al. |
| 2013/0318180 A1 | 11/2013 | Amin et al. |
| 2013/0325948 A1* | 12/2013 | Chen ............... G06Q 50/01 709/204 |
| 2013/0346329 A1 | 12/2013 | Alib-bulatao et al. |
| 2014/0074856 A1* | 3/2014 | Rao ............... G06Q 50/01 707/748 |
| 2014/0089400 A1* | 3/2014 | Yan ............... G06Q 50/01 709/204 |
| 2014/0089816 A1 | 3/2014 | Dipersia et al. |
| 2014/0122692 A1* | 5/2014 | Klein ............... G06F 11/3089 709/224 |
| 2014/0173020 A1* | 6/2014 | Reilly ............... H04L 67/32 709/217 |
| 2014/0297550 A1 | 10/2014 | Miller et al. |
| 2014/0314188 A1 | 10/2014 | Nagarajan et al. |
| 2014/0317142 A1 | 10/2014 | Naidu |
| 2014/0317188 A1 | 10/2014 | Thorne-yocam |
| 2015/0052456 A1 | 2/2015 | Engelking |
| 2015/0067048 A1 | 3/2015 | Kannan et al. |
| 2015/0095121 A1 | 4/2015 | Bastian et al. |
| 2015/0159337 A1 | 6/2015 | Kellner |
| 2015/0215349 A1* | 7/2015 | Sherman ............... H04L 65/403 709/204 |
| 2015/0237464 A1* | 8/2015 | Shumaker ............... H04L 51/20 709/204 |
| 2015/0242967 A1 | 8/2015 | Shsh |
| 2015/0347578 A1* | 12/2015 | Tsai ............... G06O 30/02 715/205 |
| 2015/0347593 A1* | 12/2015 | Tsai ............... G06F 17/30867 707/722 |
| 2015/0347974 A1* | 12/2015 | Sinha ............... G06Q 10/1053 705/319 |
| 2015/0379535 A1* | 12/2015 | Wang ............... G06Q 30/0204 705/7.33 |
| 2016/0034425 A1* | 2/2016 | Liu ............... G06F 17/30056 715/202 |
| 2016/0037213 A1* | 2/2016 | Collins ............... H04N 21/44218 725/10 |
| 2016/0044119 A1* | 2/2016 | Wirth ............... H04L 67/22 709/204 |
| 2016/0063442 A1 | 3/2016 | Bennett et al. |
| 2016/0078133 A1* | 3/2016 | Santhanann ............... G06F 17/30991 707/734 |
| 2016/0104261 A1 | 4/2016 | Brinton et al. |
| 2016/0132198 A1 | 5/2016 | Sinclair et al. |
| 2016/0149851 A1 | 5/2016 | Pan et al. |
| 2016/0149852 A1 | 5/2016 | Pan et al. |
| 2016/0164985 A1* | 6/2016 | Song ............... H04L 67/22 709/206 |
| 2016/0203523 A1* | 7/2016 | Spasojevic ............... G06Q 30/0269 705/14.66 |
| 2016/0380952 A1 | 12/2016 | Vora et al. |
| 2017/0154317 A1* | 6/2017 | Bruce ............... G06Q 10/1097 |
| 2017/0262762 A1* | 9/2017 | Conover ............... G06Q 50/01 |
| 2017/0323312 A1* | 11/2017 | Penumaka et al. ............... G06Q 30/0201 |

OTHER PUBLICATIONS

"Applicant Initiated Interview Summary Issued in U.S. Appl. No. 14/880,959", dated Dec. 11, 2017, 2 Pages.

"Non Final Office Action Issued in U.S. Appl. No. 14/880,959", dated Mar. 5, 2018, 13 Pages.

"Non Final Office Action Issued in U.S. Appl. No. 14/880,959", dated Jul. 14, 2017, 14 Pages.

"Response filed in U.S. Appl. No. 14/880,959", filed Jun. 21, 2018, 11 Pages.

"Response filed in U.S. Appl. No. 14/880,959", filed Dec. 14, 2017, 16 Pages.

"Applicant Initiated Interview Summary Issued in U.S. Appl. No. 14/880,992", dated May 7, 2018, 3 Pages.

"Applicant Initiated Interview Summary Issued in U.S. Appl. No. 14/880,992", dated Jan. 29, 2018, 3 Pages.

"Final Office Action Issued in U.S. Appl. No. 14/880,992", dated Mar. 26, 2018, 14 Pages.

"Non Final Office Action Issued in U.S. Appl. No. 14/880,992", dated Sep. 11, 2017, 14 Pages.

"Non Final Office Action Issued in U.S. Appl. No. 14/880,992", dated Jul. 26, 2018, 16 Pages.

"Response filed in U.S. Appl. No. 14/880,992", filed Feb. 12, 2018, 18 Pages.

"Response filed in U.S. Appl. No. 14/880,992", filed Jun. 21, 2018, 14 Pages.

"Notice of Allowance Issued in U.S. Appl. No. 14/880,959", dated Oct. 3, 2018, 10 Pages.

* cited by examiner

INTELLIGENT SCHEDULING FOR EMPLOYEE ACTIVATION

RELATED APPLICATIONS

This application claims the benefit of priority to U.S. Provisional Patent Application Ser. No. 62/083,847, filed Nov. 24, 2014, which is incorporated herein by reference in its entirety.

TECHNICAL FIELD

The present application relates generally to data processing systems and, in one specific example, to techniques for intelligent scheduling of content sharing by company employees via an online social networking service.

BACKGROUND

Online social networking services such as LinkedIn® are becoming increasingly popular, with many such websites boasting millions of active members. Each member of the online social networking service is able to upload an editable member profile page to the online social networking service. The member profile page may include various information about the member.

BRIEF DESCRIPTION OF THE DRAWINGS

Some embodiments are illustrated by way of example and not limitation in the figures of the accompanying drawings in which.

DETAILED DESCRIPTION

Example methods and systems for intelligent scheduling of content sharing by company employees via an online social networking service are described. In the following description, for purposes of explanation, numerous specific details are set forth in order to provide a thorough understanding of example embodiments. It will be evident, however, to one skilled in the art that the embodiments of the present disclosure may be practiced without these specific details.

Figure 3:
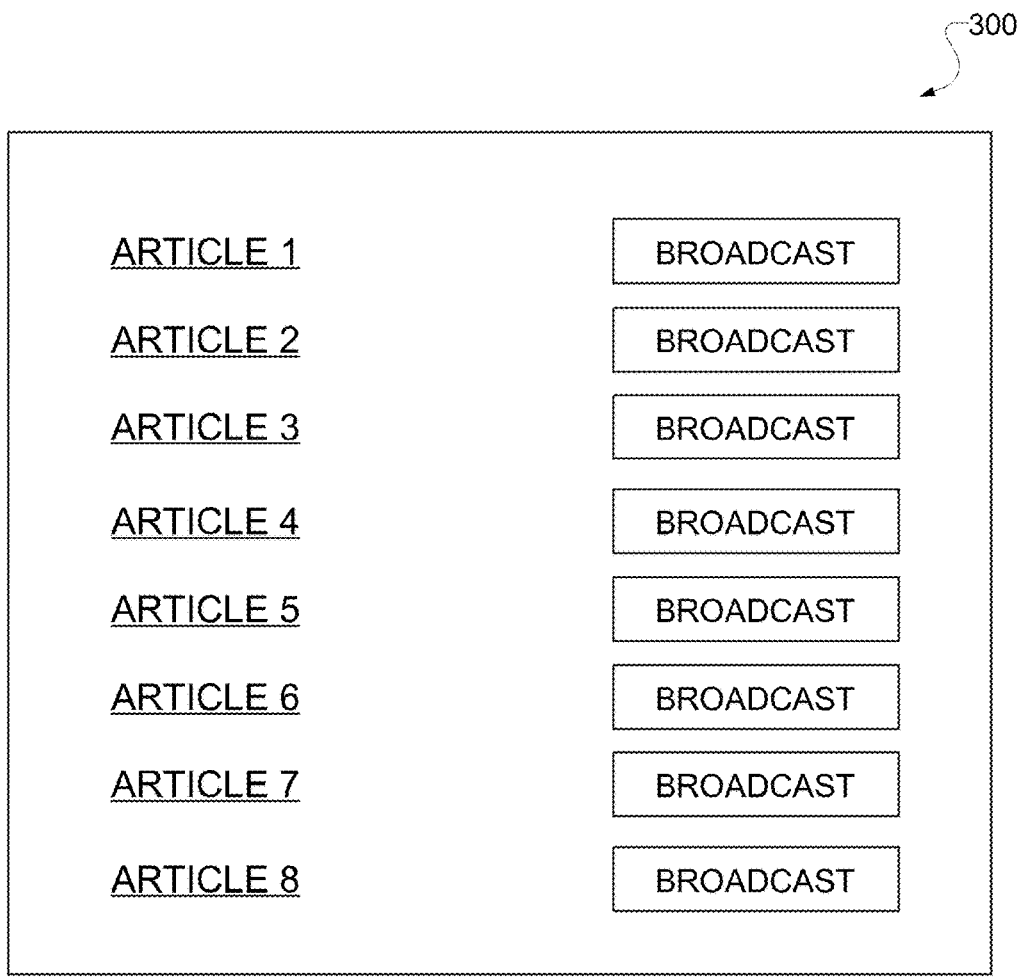
FIG. 3 illustrates an example portion of a user interface, according to various embodiments.

According to various example embodiments, an employee activation system enables company administrators to leverage their employee's social networks in order to expand the reach of the company through various online social networking services. For example, in some embodiments, the employee activation system displays an administrator user interface to an administrator or other personnel associated with a company. The administrator user interface may display various suggested content items, such as news items, articles, publications, etc., such as via a content feed. The employee activation system enables the company administrator to select a specific content item to be broadcast to employees of the company (For example, the administrator may select the "BROADCAST" button associated with one of the articles in the content feed displayed in FIG. 3). The system will then broadcast a recommendation to view the selected content item to one or more of the employees of the company.

Figure 4:
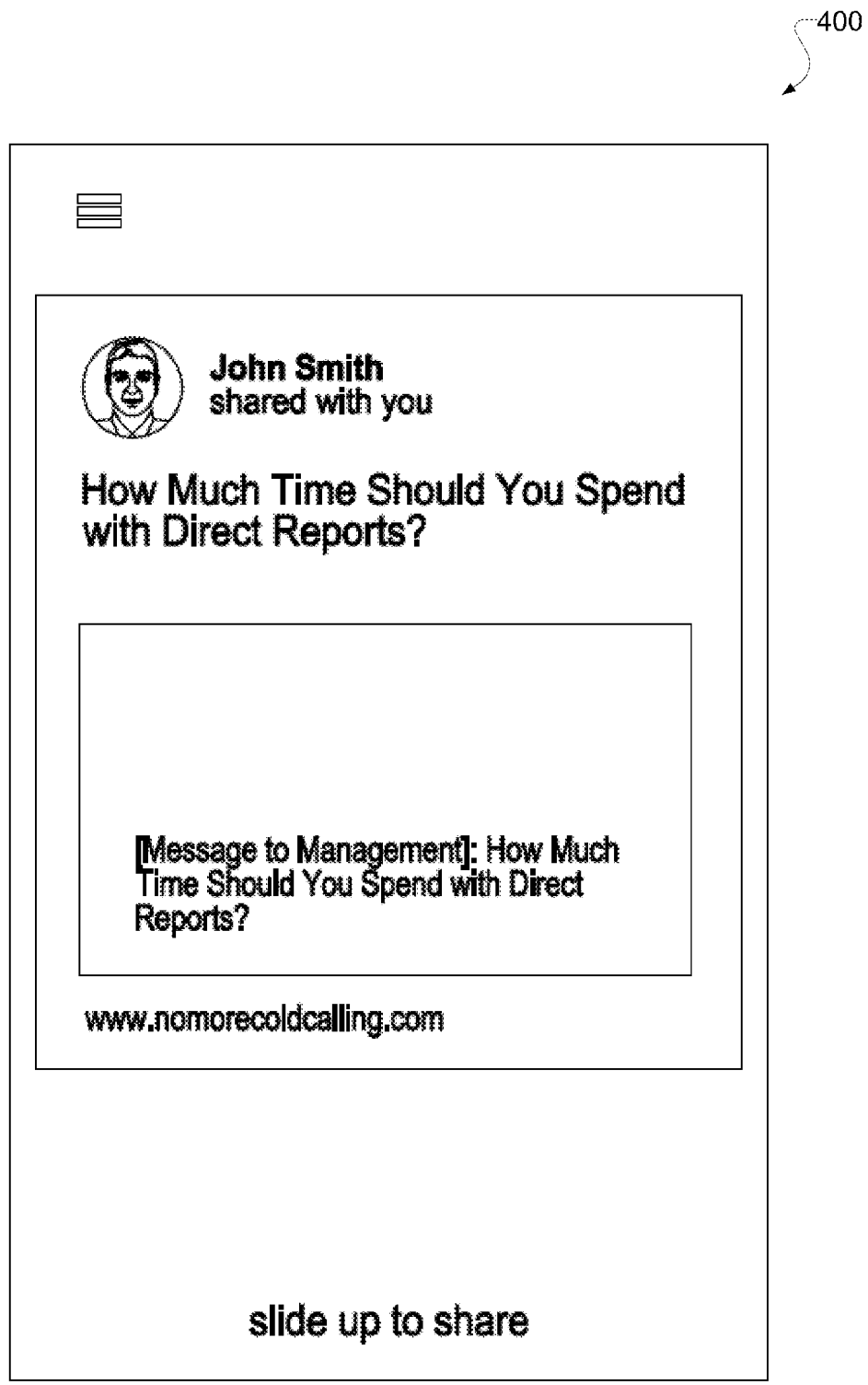
FIG. 4 illustrates an example portion of a user interface, according to various embodiments.

Thereafter, the relevant employees may receive the broadcasted recommendations to view the specific content item, such as via a mobile application on their mobile device that is associated with the online social networking service (e.g., see FIG. 4). The employee can then browse through the suggested content and share a piece of content among their various networks of connections on various online social networking services, such as Facebook®, Twitter®, Instagram®, LinkedIn®, etc. (e.g., see FIG. 5). Accordingly, the employee activation system enables a company administrator to broadcast a piece of content to the employees of the company, and then enables the employees of that company to share that content among their networks on various online social networking services.

Thus, by delivering highly-relevant professional content and encouraging content sharing, the employee activation system enables employees to be more productive and successful, by helping them to reach audiences related to their day-to-day work and build their professional brand. Meanwhile, companies are motivated to assist and elevate their employees, and the employee activation system provides companies with the insights necessary to ensure relevant content for their employees. Thus, the employee activation system harnesses company motivation and insight, and the hypothesis that colleagues have a good sense of what content is professionally relevant to others in that company, in order to deliver the right content to the right professionals, and to activate employees on social networks. Accordingly, by improving the relevance of content shared with employees and other users, the system described herein efficiently provides users with more relevant content sooner, which reduces the need for further searching and browsing for content on the part of users. This may result in a reduction in the processing power and network bandwidth demands placed on an online social networking service's hardware and software infrastructure.

Figure 1:
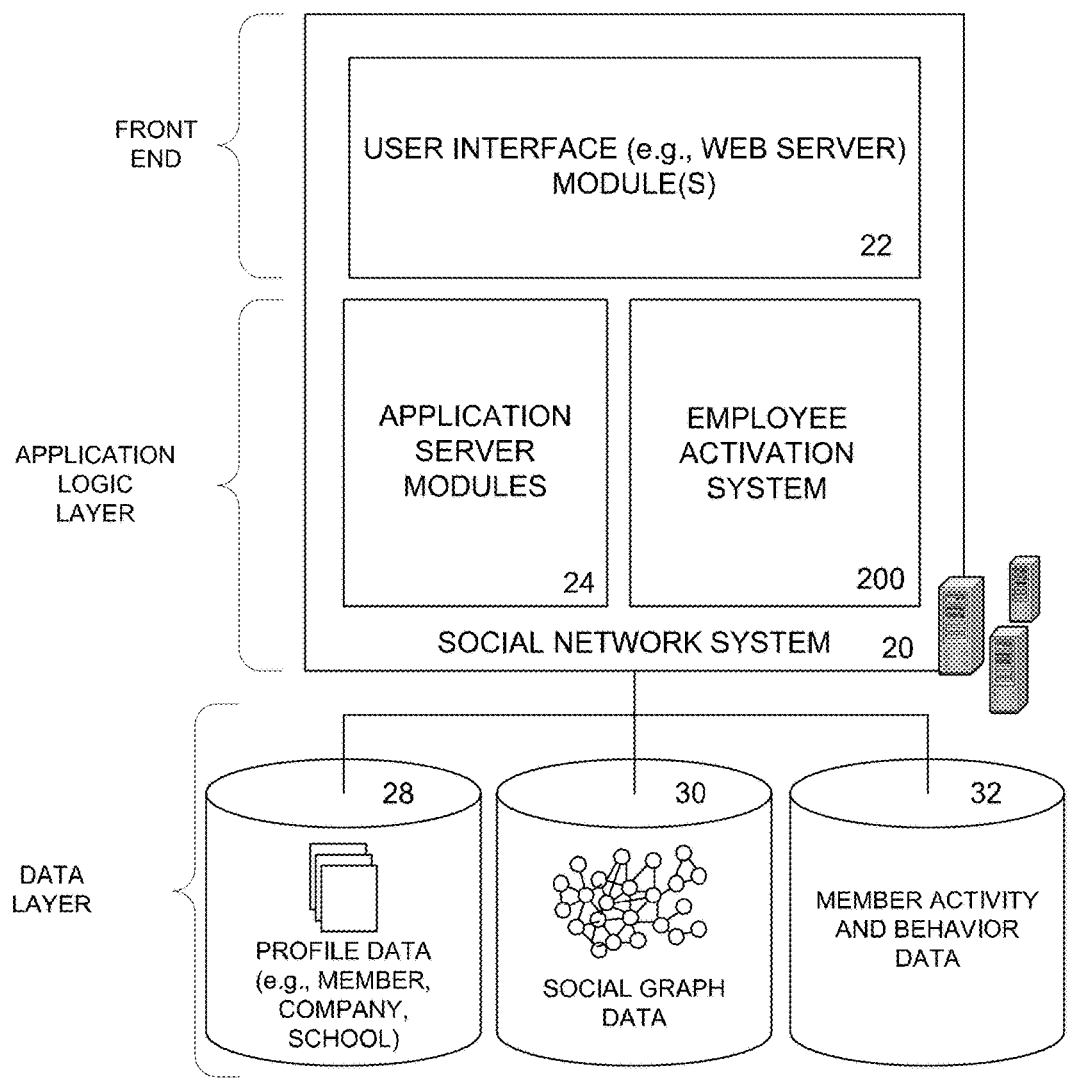
FIG. 1 is a block diagram showing the functional components of a social networking service, consistent with some embodiments of the present disclosure.

FIG. 1 is a block diagram illustrating various components or functional modules of a social networking service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 24, which, in conjunction with the user interface module(s) 22, generates various user interfaces (e.g., web pages) with data retrieved from various data sources in the data layer. With some embodiments, individual application server modules 24 are used to implement the functionality associated with various services and features of the social networking service. For instance, the ability of an organization to establish a presence in the social graph of the social networking service, including the ability to establish a customized web page on behalf of an organization, and to publish messages or status updates on behalf of an organization, may be services implemented in independent application server modules 24. Similarly, a variety of other applications or services that are made available to members of the social networking service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social networking service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social networking service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social networking service may provide a broad range of other applications and services that allow members the opportunity to share and receive information, often customized to the interests of the member. For example, with some embodiments, the social networking service may include a photo sharing application that allows members to upload and share photos with other members. With some embodiments, members may be able to self-organize into groups, or interest groups, organized around a subject matter or topic of interest. With some embodiments, the social networking service may host various job listings providing details of job openings with various organizations.

As members interact with the various applications, services and content made available via the social networking service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as an employee activation system 200. The employee activation system 200 is described in more detail below in conjunction with FIG. 2.

Although not shown, with some embodiments, the social network system 20 provides an application programming interface (API) module via which third-party applications can access various services and data provided by the social networking service. For example, using an API, a third-party application may provide a user interface and logic that enables an authorized representative of an organization to publish messages from a third-party application to a content hosting platform of the social networking service that facilitates presentation of activity or content streams maintained and presented by the social networking service. Such third-party applications may be browser-based applications, or may be operating system-specific. In particular, some third-party applications may reside and execute on one or more mobile devices (e.g., phone, or tablet computing devices) having a mobile operating system.

As described in more detail below, in some embodiments, once a company employee receives content broadcasted by a company administrator and selects that content for sharing (e.g., see FIGS. 4 and 5), the employee activation system 200 will determine the best time to share that content among the employee's network connections. Thus, in some cases, the content will not be immediately shared to the employee's network, but rather the employee activation system 200 may delay the sharing of content until an optimum sharing time when the shared content will receive the greatest degree of engagement (e.g., views, comments, likes, shares, etc.) from the member's network.

Figure 2:
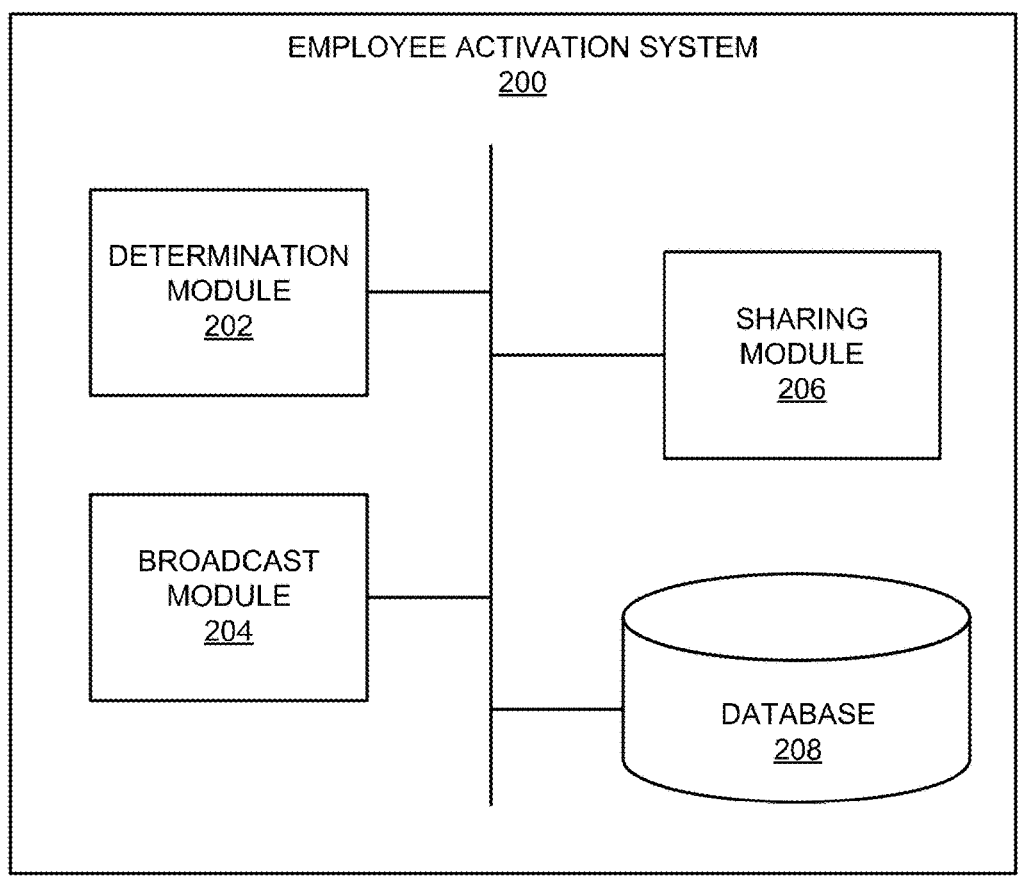
FIG. 2 is a block diagram of an example system, according to various embodiments.

Turning now to FIG. 2, an employee activation system 200 includes a determination module 202, a broadcast module 204, a sharing module 206, and a database 208. The modules of the employee activation system 200 may be implemented on or executed by a single device such as an employee activation device, or on separate devices interconnected via a network. The aforementioned employee activation device may be, for example, one or more client machines or application servers. The operation of each of the aforementioned modules of the employee activation system 200 will now be described in greater detail in conjunction with the various figures.

Figure 5:
FIG. 5 illustrates an example portion of a user interface, according to various embodiments.
Figure 6:
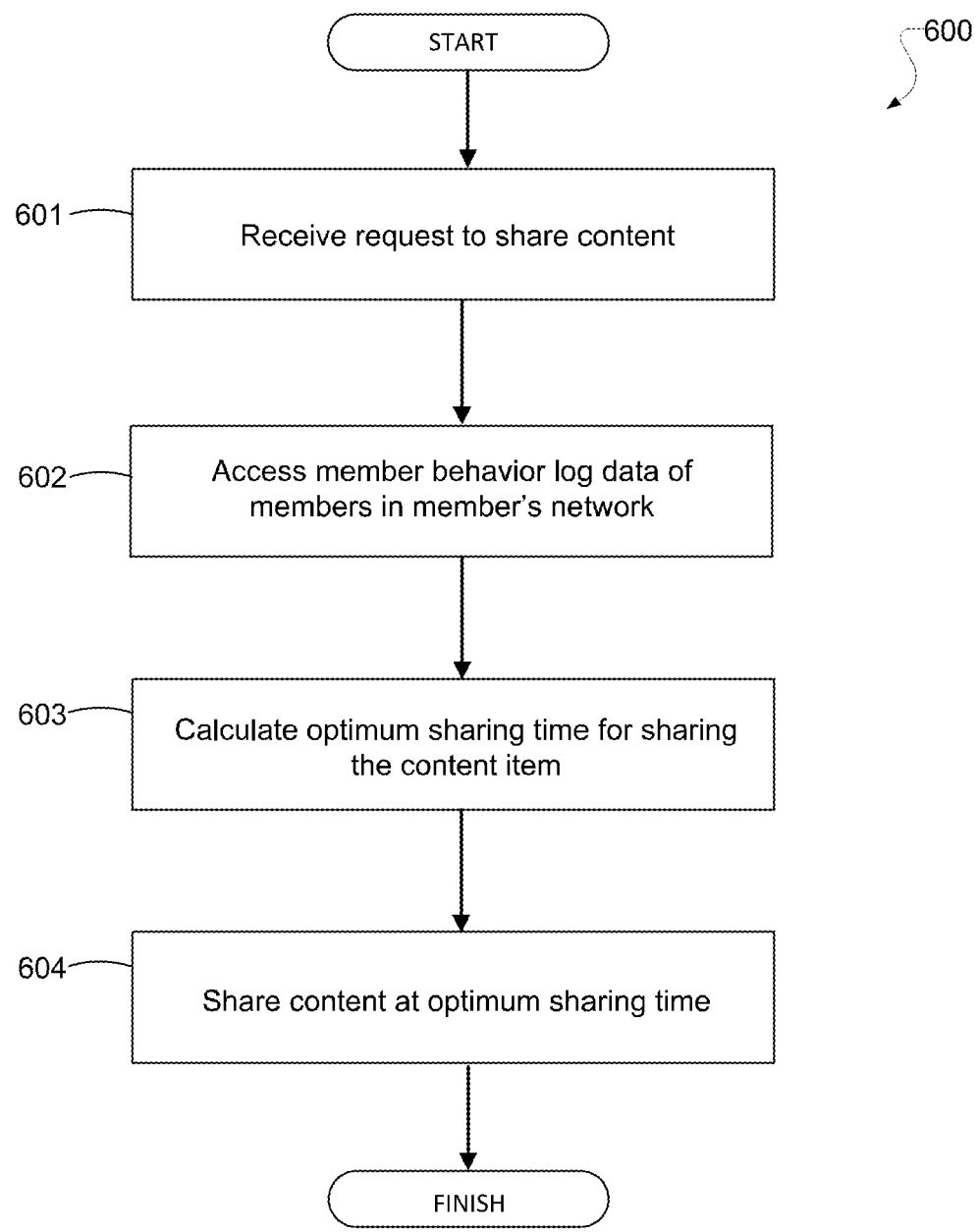
FIG. 6 is a flowchart illustrating an example method, according to various embodiments.

FIG. 6 is a flowchart illustrating an example method 600, consistent with various embodiments described herein. The method 600 may be performed at least in part by, for example, the employee activation system 200 illustrated in FIG. 2 (or an apparatus having similar modules, such as one or more client machines or application servers). In operation 601, the determination module 202 receives a share request from a member of an online social networking service to share a content item among members in the member's connection network on the online social networking service. Thus, the share request is a request to share the specific content item among the employee's connections on a specific online social networking service, such as Facebook®, Twitter®, Instagram®, LinkedIn® etc. For example, FIG. 4 illustrates an example of an employee user interface 400 displayed via a mobile application installed on a mobile device of an employee. The employee user interface 400 displays a content item entitled "Message to management; how much time should you spend with the direct reports?" shared by a company administrator "John Smith". The employee may select to this article for sharing (e.g., by sliding up on the user interface 400), and the determination module 202 may display the user interface 500 illustrated in FIG. 5, which enables the employee to prepare and send a share message (e.g., by displaying keypad allowing the employee to modify the title of the share message). In particular, the determination module 202 may display, via the employee user interface 500, indicia of multiple online social networking services (e.g., the LinkedIn® symbol and the Twitter® symbol as illustrated in FIG. 5), and the determination module 202 may receive, via the employee user interface, a user selection of one of the indicia associated with a specific online social networking service.

In operation 602, the determination module 202 accesses member behavior log data associated with the other members in the connection network of the member (e.g., the member's friends or connections on whichever social network the member selected in operation 601). In operation 603, the determination module 202 calculates, based on the accessed member behavior log data accessed in operation 602, an optimum sharing time for sharing the content item among the members in the member's connection network. The calculation of the optimum sharing time is described in more detail below. In operation 604, the sharing module 206 causes the content item to be shared at the optimum sharing time (calculated in operation 603) with the members in the member's connection network. It is contemplated that the operations of method 600 may incorporate any of the other features disclosed herein. Various operations in the method 600 may be omitted or rearranged.

In some embodiments, the determination module 202 may calculate the optimum sharing time by identifying, based on the access behavior log data, a time period when a largest portion of the members in the member's connection network tend to be in state of active engagement with the online social networking service. For example, the determination module 202 may determine, for each of various time periods (e.g., a 5 minute portion of the day, a 30 minute portion of the day, an hour of the day, a day of the week, etc.), when the largest number of members in the member's connection network are in the state of active engagement, where a user is in a state of active engagement if they submit at least one of a predetermined number of views, likes, shares, comments, etc., on content items associated with the online social networking service. Thus, if the determination module 202 determines that more members in the member's connection network are in active engagement at 4 pm than at 3 pm or 5 pm or any other time of the day, then the optimum sharing time will be determined to be 4 pm. In some embodiments, if the share request is received on a given day of the week (e.g., Tuesday, Saturday, etc.), a given season or holiday period (e.g., summer, Christmas, etc.), a given week of the year, etc., then the determination module 202 may determine the optimum sharing time based on behavior log data showing how the other members have behaved on similar days in the past, since member behavior may differ on different days, seasons, etc.

Figure 7:
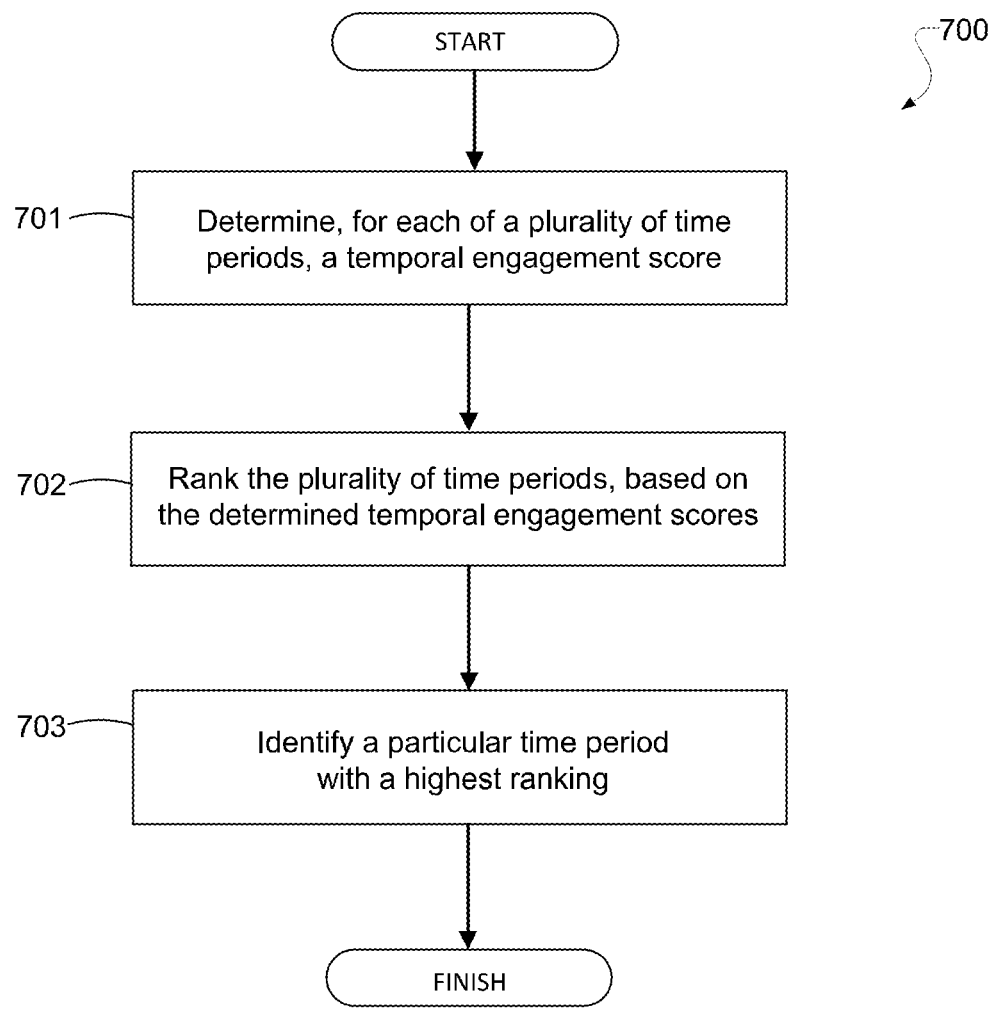
FIG. 7 is a flowchart illustrating an example method, according to various embodiments.

In some embodiments, the determination module 202 may calculate the optimum sharing time by using machine learning models to predict how members in the member's network may interact with the content item. For example, FIG. 7 is a flowchart illustrating an example method 700 for calculating an optimum sharing time, consistent with various embodiments described herein. The method 700 may be performed at least in part by, for example, the employee activation system 200 illustrated in FIG. 2 (or an apparatus having similar modules, such as one or more client machines or application servers). In operation 701, the determination module 202 determines, for each of a plurality of time periods, a temporal engagement score indicating an inferred level of engagement with the content item by members in a connection network (e.g., the connection network of the member described in method 600) during the corresponding time period. In some embodiments, the may determine a temporal engagement score for a given time period as follows. Firstly, the determination module 202 may infer, for each specific member in the member's connection network, based on a trained machine learning model, a likelihood (e.g., a probability) of the specific member engaging with the content item during the given time period. Thereafter, the determination module 202 may generate the temporal engagement score associated with the given time period, based on all the inferred likelihoods for all the members in the connection network. For example, the determination module 202 may calculate the average, mean, median, mode, etc., of the likelihoods, in order to generate the temporal engagement score. As another example, the determination module 202 may identify the number or proportion of the members associated with a likelihood greater than a predetermined threshold (e.g., greater than 50%), and this may be set as the temporal engagement score (or otherwise utilized to calculate the temporal engagement score) for the given time period.

In operation 702, the determination module 202 ranks the plurality of time periods discussed in operation 701, based on the determined temporal engagement scores (determined in operation 701) corresponding to the plurality of time periods. For example, the time periods with the higher temporal engagement scores may be ranked higher than the time periods with the lower temporal engagement scores. In operation 703, the determination module 202 identifies a particular time period from among the plurality of time periods (ranked in operation 702) that is associated with a highest ranking. Thus, the determination module 202 may identify the time period with the highest ranking and/or the highest temporal engagement scores. It is contemplated that the operations of method 700 may incorporate any of the other features disclosed herein. Various operations in the method 700 may be omitted or rearranged.

The trained machine learning model described above may be trained to predict a likelihood that a given member will interact with a given content item. For example, the machine learning model may correspond to a logistic regression model trained based on positive training data and negative training data. The positive training data may correspond to logged events when a particular member previously interacted with content items, and may include feature data describing the member profile data (e.g., member profile attributes such as location, skills, company, education, seniority level, company size, etc.), behavior log data describing the context of their previous interactions (e.g., time, location, device-type or operating system used when interacting with the content, etc.), and content description data describing the content being interacted with (e.g., where it is displayed, format, appearance, content, etc.). On the other hand, the negative training data may correspond to logged events when a particular member did not previously interact with content items, and may include feature data describing the member profile data (e.g., member profile attributes such as location, skills, company, education, seniority level, company size, etc.), behavior log data describing the context of their previous non-interactions (e.g., time, location, device-type or operating system used when they did not interact with the content, etc.), and content description data describing the content not being interacted with (e.g., where it is displayed, format, appearance, content, etc.). Based on the aforementioned positive and negative training data, the co-efficient of the logistic regression model may be trained to predict the likelihood that a given member having given member profile data may interact with a given content item in a given context, where this information may be encoded into a feature vector for input into the trained machine learning model.

In some embodiments, the connection network may be different from the online social network via which the member (e.g., a company employee) initially received the content item from a company administrator. Put another way, a company administrator may have broadcasted (via the broadcast module 204) the content item to a company employee via a first online social networking service (e.g., LinkedIn®), and then the company employee may share that content with their member connections in their personal network on a second online social networking service (e.g., Facebook®, Twitter®, Instagram®, etc.).

In some embodiments, the employee activation system 200 may share a given content item more than once in order to maximize engagement. For example, some social networks such as Twitter® feature a time-based or chronological content feed where items are posted as they are shared. Thus, after time elapses pursuant to the first share, the shared content item may appear less prominently (or not at all) in the content feed. Accordingly, the employee activation system 200 may share the content item multiple times in order to maximize engagement.

Figure 8:
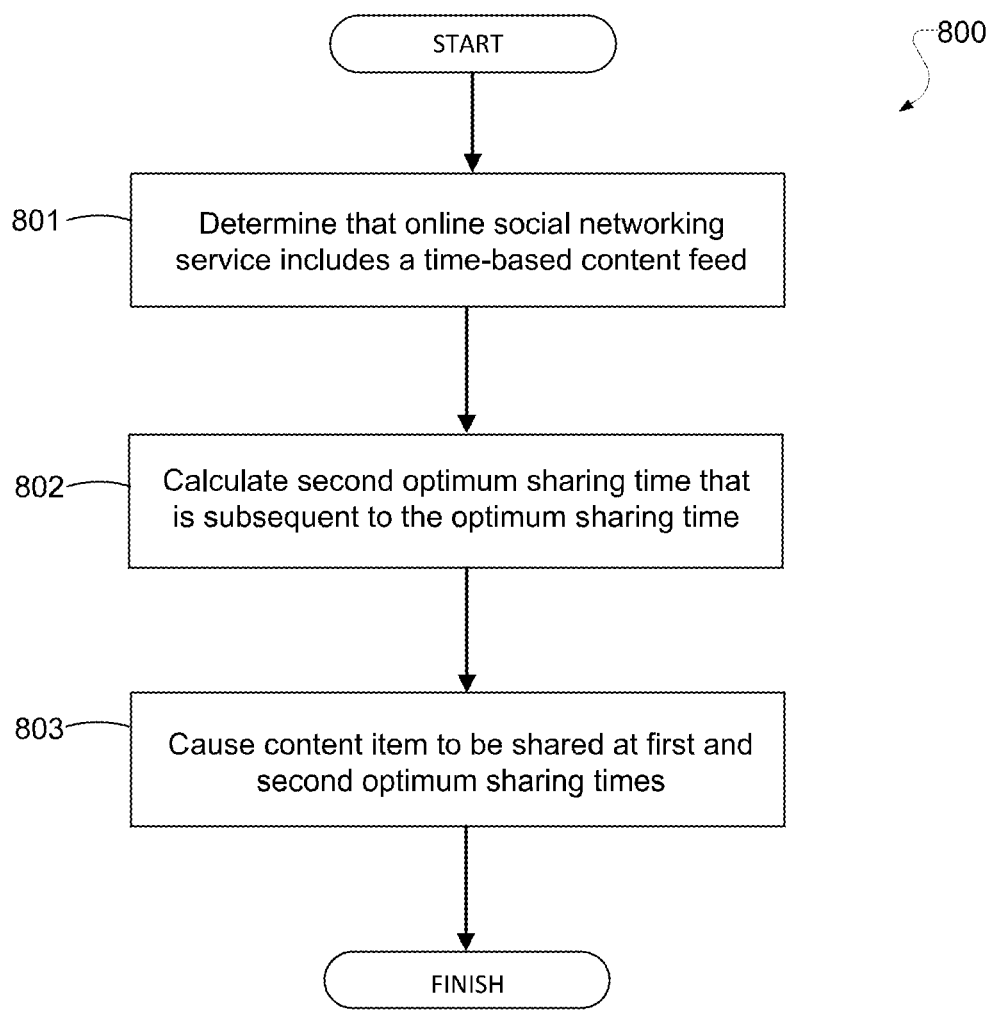
FIG. 8 is a flowchart illustrating an example method, according to various embodiments.

FIG. 8 is a flowchart illustrating an example method 800, consistent with various embodiments described herein. The method 800 may be performed at least in part by, for example, the employee activation system 200 illustrated in FIG. 2 (or an apparatus having similar modules, such as one or more client machines or application servers). In operation 801, the determination module 202 determines that an online social networking service (e.g., the online social networking service that a member is attempting to share a content item with, as described in method 600) includes a time-based content feed where content is posted chronologically (e.g., Twitter®). In operation 802, the determination module 202 calculates a second optimum sharing time that is subsequent to a first optimum sharing time (e.g., the first optimum sharing time calculated in operation 603). In some embodiments, the second optimum sharing time may be calculated as being a predetermined time delay interval (e.g., 1 hour, 1 day, etc.) after the first optimum sharing time. In some embodiments, the first optimum sharing time may correspond to a time period having the highest temporal engagement score (as described above in connection with method 600), and the second optimum sharing time may correspond to a time period having a second highest temporal engagement score (consistent with the techniques described above in connection with method 600). In some embodiments, the first optimum sharing time may correspond to a time period having the highest temporal engagement score (as described above in connection with method 600), and the second optimum sharing time may correspond to one of the time periods that is at least a predetermined time delay interval (e.g., 1 hour, 1 day, etc.) after the first optimum sharing time, and that has the highest temporal engagement score among these time periods that is at least a predetermined time delay interval (e.g., 1 hour, 1 day, etc.) after the first optimum sharing time. For example, if the first optimum sharing time is 10 am, and the predetermined time delay interval is 6 hours, then the determination module 202 may analyze all time periods after 4 pm that day and determine which one has the highest temporal engagement score (e.g., perhaps 5 pm).

In operation 803, the sharing module 206 causes the content item to be shared to the members in the connection network at the optimum sharing time and at the second optimum sharing time calculated in operation 802. It is contemplated that the operations of method 800 may incorporate any of the other features disclosed herein. Various operations in the method 800 may be omitted or rearranged. In some embodiments, the employee activation system 200 may share the content more than 2 times, such as by calculating a third optimum sharing time, a fourth optimum sharing time, and so on, using the techniques described herein (e.g., in method 800).

In some embodiments, if the employee activation system 200 detects that duplicate shares of a content item among a group of recipient members may occur, the employee activation system 200 may stagger the shares of the content item for maximum engagement by the recipient members. For example, as described above, a company administrator may broadcast a content item to one or more company employees (e.g., see FIG. 3), and thus it is possible that a group of employees may receive a broadcast (e.g., see FIG. 4) at approximately the same time, and that the employees may choose to share the broadcast (e.g., see FIG. 5) at approximately the same time. However, since the company employees work at the same company, it is likely they have similar network connections (e.g., other company employees), and thus it is likely their share requests will have similar optimum sharing times (as calculated in method 600), since their network connections are likely to best engage with the shared content at the same time. Thus, the employee activation system 200 may stagger or space out the shares for maximum engagement.

Figure 9:
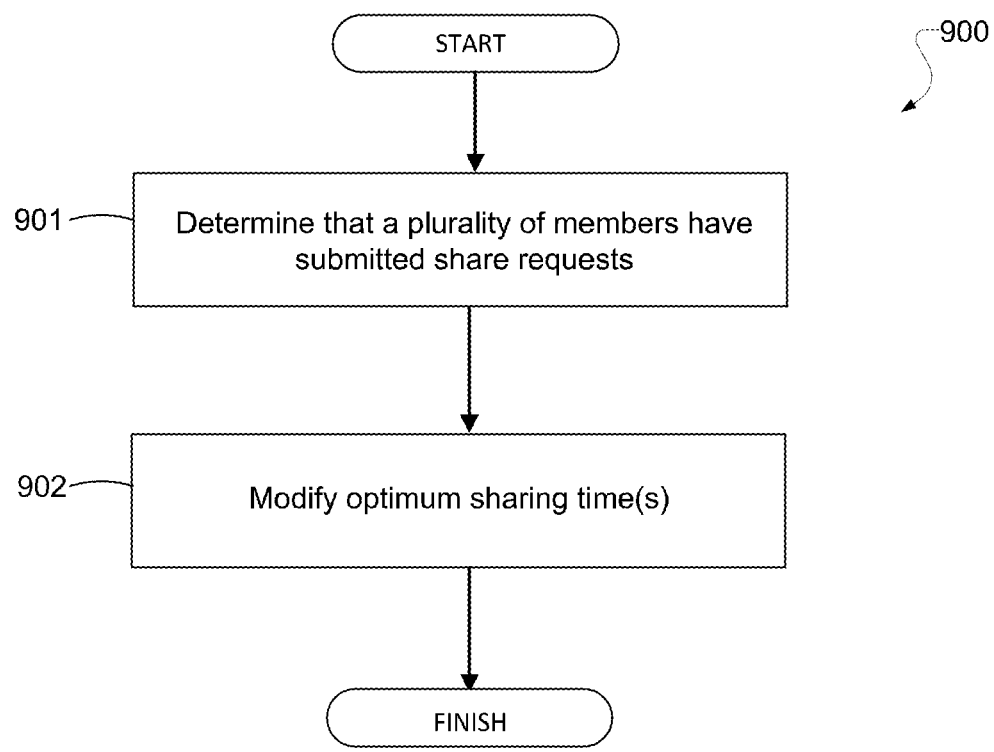
FIG. 9 is a flowchart illustrating an example method, according to various embodiments.

FIG. 9 is a flowchart illustrating an example method 900, consistent with various embodiments described herein. The method 900 may be performed at least in part by, for example, the employee activation system 200 illustrated in FIG. 2 (or an apparatus having similar modules, such as one or more client machines or application servers). In operation 901, the determination module 202 determines that a plurality of members of the online social networking service including the member are company employees of a company and have submitted, during a predetermined time interval (e.g., within 15 minutes of each other, within an hour of each other, etc.), requests to share the content item. In operation 902, the determination module 202 modifies the optimum sharing time calculated for each of the company employees (e.g., as calculated in method 600 after each of the company employees submits a share request), to thereby generate a set of staggered optimum sharing times. For instance, the sharing module 206 may ensure that there is at least a predetermined delay time interval (e.g., an hour) between each of the staggered optimum sharing times and another one of the staggered optimum sharing times. For example, in some embodiments, the first share request that is received first may be shared first (e.g., at the optimum sharing time calculated for that first share request, as calculated in method 600), and the share request received second may be shared at the predetermined delay time interval after the first share request is shared, the share request received third may be shared at the predetermined delay time interval after the second share request is shared, and so on. Alternatively, in some embodiments, the first share request that is received first may be shared first (e.g., at the optimum sharing time calculated for that first share request, as calculated in method 600), the share request received second may be shared second at the second optimum sharing time calculated for the second share request (e.g., as calculated in the method 800), the third share request received third may be shared third at the third optimum sharing time calculated for the third share request (e.g., as calculated in the method 800), and so on. It is contemplated that the operations of method 900 may incorporate any of the other features disclosed herein. Various operations in the method 900 may be omitted or rearranged.

Various embodiments herein describe member profile attributes. In some embodiments, the member profile attribute is any of location, role, industry, language, current job, employer, experience, skills, education, school, endorsements, seniority level, company size, connections, connection count, account level, name, username, social media handle, email address, phone number, fax number, resume information, title, activities, group membership, images, photos, preferences, news, status, links or URLs on a profile page, and so forth.

In some embodiments, the employee activation system 200 may display a user interface enabling an operator of the employee activation system 200 to configure the aforementioned predetermined time periods and time delay intervals.

Example Prediction Models

As described above, the determination module 202 may use any one of various known prediction modeling techniques to perform the prediction modeling. For example, according to various exemplary embodiments, the determination module 202 may apply a statistics-based machine learning model such as a logistic regression model to member profile data, behavioral log data, and content item description data associated with members of an online social network or content items. As understood by those skilled in the art, logistic regression is an example of a statistics-based machine learning technique that uses a logistic function. The logistic function is based on a variable, referred to as a logit. The logit is defined in terms of a set of regression coefficients of corresponding independent predictor variables. Logistic regression can be used to predict the probability of occurrence of an event given a set of independent/predictor variables. A highly simplified example machine learning model using logistic regression may be $\ln[p/(1-p)]=a+BX+e$, or $[p/(1-p)]=\exp(a+BX+e)$, where ln is the natural logarithm, $\log_{exp}$, where exp=2.71828 . . . , p is the probability that the event Y occurs, $p(Y=1)$, $p/(1-p)$ is the "odds ratio", $\ln[p/(1-p)]$ is the log odds ratio, or "logit", a is the coefficient on the constant term, B is the regression coefficient(s) on the independent/predictor variable(s), X is the independent/predictor variable(s), and e is the error term. In some embodiments, the independent/predictor variables of the logistic regression model may correspond to member profile data, behavioral log data, and content item description data (where the aforementioned member profile data, behavioral log data, and content item description data may be encoded into numerical values and inserted into feature vectors). The regression coefficients may be estimated using maximum likelihood or learned through a supervised learning technique from the recruiting intent signature data, as described in more detail below. Accordingly, once the appropriate regression coefficients (e.g., B) are determined, the features included in a feature vector (e.g., member profile data, behavioral log data, and content item description data) may be applied to the logistic regression model in order to predict the probability (or "confidence score") that the event Y occurs (where the event Y may be, for example, a particular member interacting with a content item). In other words, provided a feature vector including various member profile data, behavioral log data, and content item description data, the feature vector may be applied to a logistic regression model to determine the probability that a particular member will interact with a content item. Logistic regression is well understood by those skilled in the art, and will not be described in further detail herein, in order to avoid occluding various aspects of this disclosure. The determination module 202 may use various other prediction modeling techniques understood by those skilled in the art to generate the aforementioned confidence score. For example, other prediction modeling techniques may include other computer-based machine learning models such as a gradient-boosted machine (GBM) model, a Naïve Bayes model, a support vector machines (SVM) model, a decision trees model, and a neural network model, all of which are understood by those skilled in the art.

According to various embodiments described above, the feature data may be used for the purposes of both off-line training (for generating, training, and refining a prediction model and or the coefficients of a prediction model) and online inferences (for generating confidence scores). For example, if the determination module 202 is utilizing a logistic regression model (as described above), then the regression coefficients of the logistic regression model may be learned through a supervised learning technique from the feature data. Accordingly, in one embodiment, the employee activation system 200 may operate in an off-line training mode by assembling the feature data into feature vectors. The feature vectors may then be passed to the determination module 202, in order to refine regression coefficients for the logistic regression model. For example, statistical learning based on the Alternating Direction Method of Multipliers technique may be utilized for this task. Thereafter, once the regression coefficients are determined, the employee activation system 200 may operate to perform online (or offline) inferences based on the trained model (including the trained model coefficients) on a feature vector representing the feature data of a particular member of the online social network service or a particular content item. According to various exemplary embodiments, the off-line process of training the prediction model based on member profile data, behavioral log data, and content item description data may be performed periodically at regular time intervals (e.g., once a day), or may be performed at irregular time intervals, random time intervals, continuously, etc. Thus, since member profile data, behavioral log data, and content item description data may change over time, it is understood that the prediction model itself may change over time (based on the current member profile data, behavioral log data, and content item description data used to train the model).

Example Mobile Device

Figure 10:
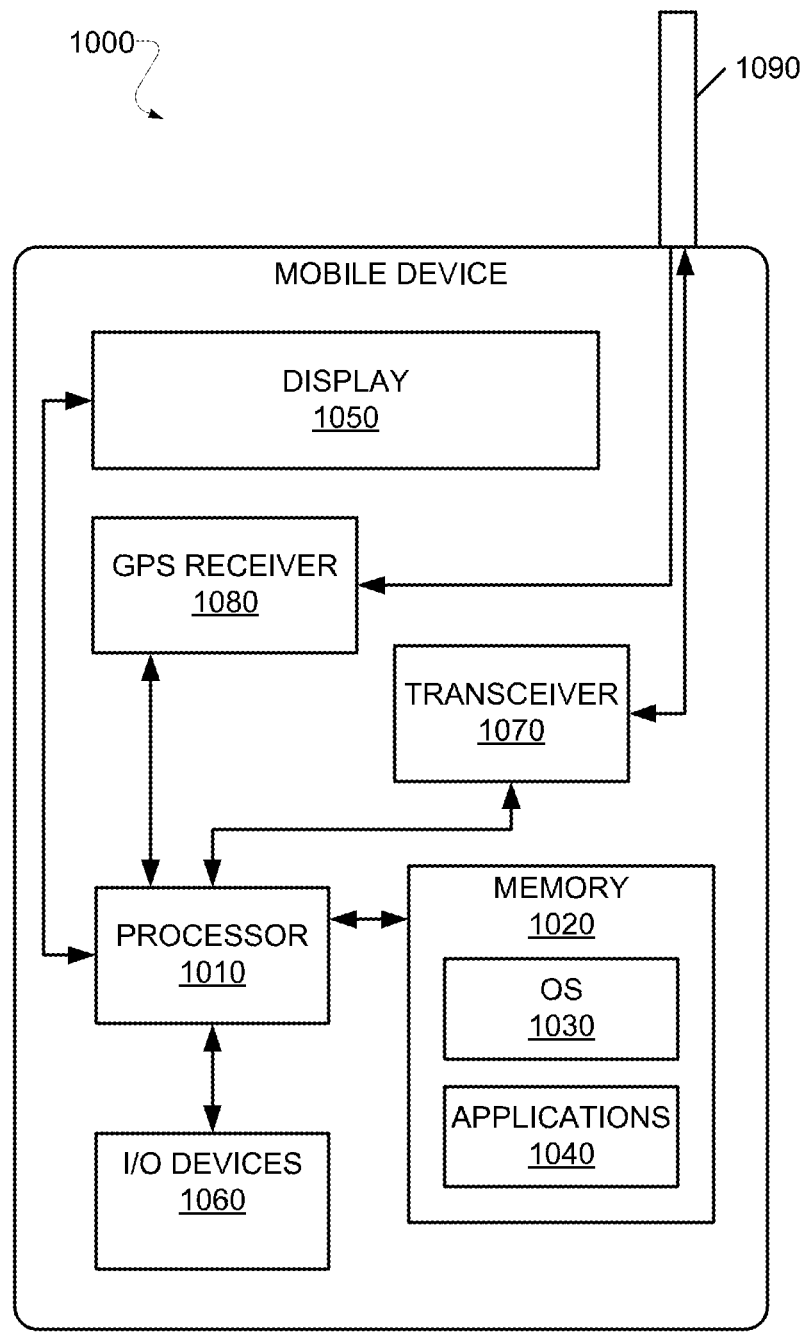
FIG. 10 illustrates an example mobile device, according to various embodiments.

FIG. 10 is a block diagram illustrating the mobile device 1000, according to an example embodiment. The mobile device may correspond to, for example, one or more client machines or application servers. One or more of the modules of the system 200 illustrated in FIG. 2 may be implemented on or executed by the mobile device 1000. The mobile device 1000 may include a processor 1010. The processor 1010 may be any of a variety of different types of commercially available processors suitable for mobile devices (for example, an XScale architecture microprocessor, a Microprocessor without Interlocked Pipeline Stages (MIPS) architecture processor, or another type of processor). A memory 1020, such as a Random Access Memory (RAM), a Flash memory, or other type of memory, is typically accessible to the processor 1010. The memory 1020 may be adapted to store an operating system (OS) 1030, as well as application programs 1040, such as a mobile location enabled application that may provide location based services to a user. The processor 1010 may be coupled, either directly or via appropriate intermediary hardware, to a display 1050 and to one or more input/output (I/O) devices 1060, such as a keypad, a touch panel sensor, a microphone, and the like. Similarly, in some embodiments, the processor 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the mobile device 1000. Further, in some configurations, a GPS receiver 1080 may also make use of the antenna 1090 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
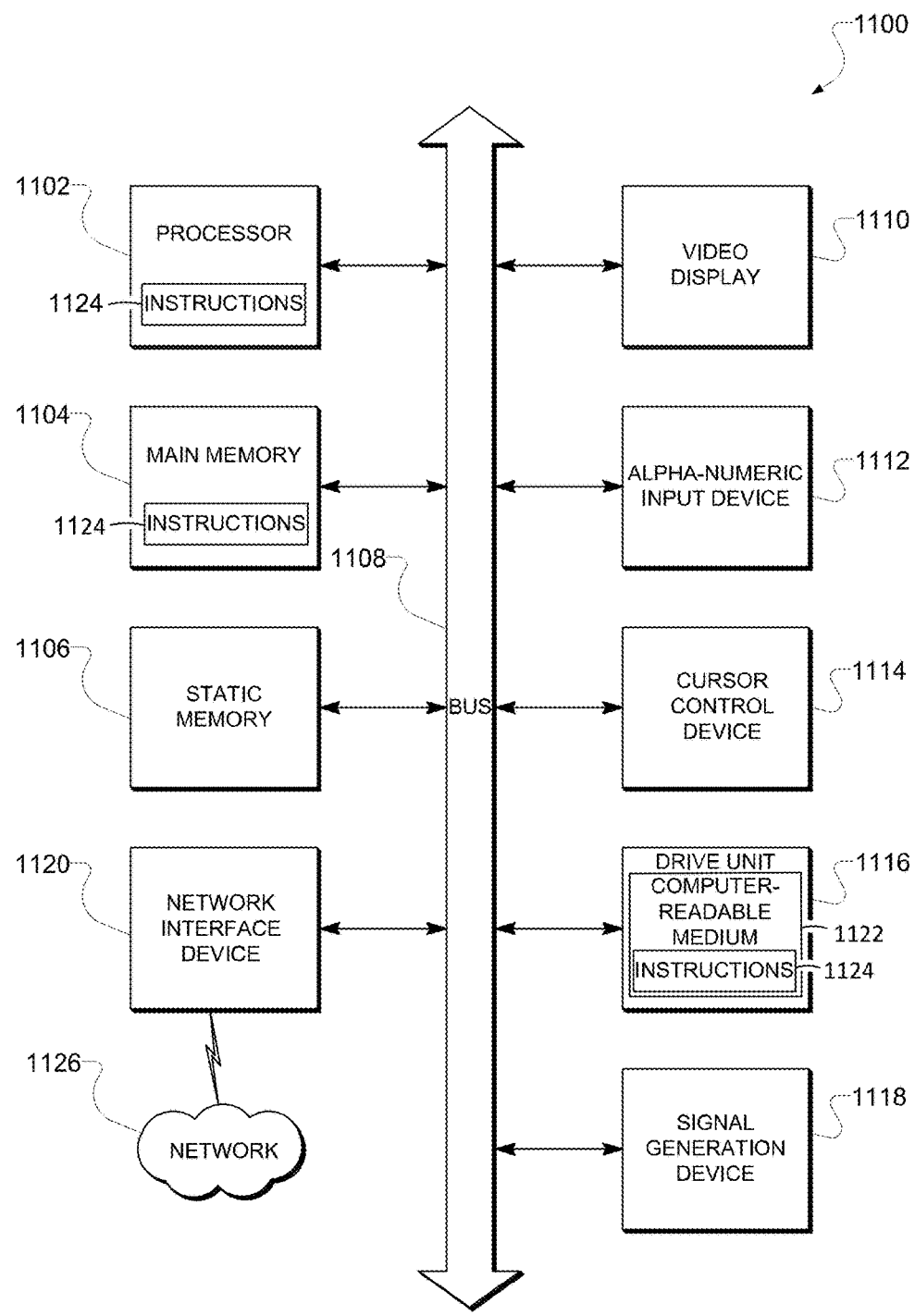
FIG. 11 is a diagrammatic representation of a machine in the example form of a computer system within which a set of instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    receiving a request from a member of an online social networking service to share a content item among members in the member's connection network on the online social networking service;
    accessing member behavior log data associated with the members in the member's connection network;
    inferring, for one or more specific members in the member's connection network, based on a machine learning model, a likelihood of the respective specific member engaging with the content item during at least a first time period and a second time period, wherein the machine learning model is trained based on feature data derived from the member behavior log data, the feature data describing previous interactions by the members in the connection network with previously shared content items;
    for at least the first time period and the second time period, determining, based on the inferred likelihoods associated with the members in the connection network, a temporal engagement score associated with the given time period, the temporal engagement score indicating an inferred level of engagement with the content item by the members in the connection network during the corresponding time period;
    ranking at least the first time period and the second time period based on the temporal engagement scores corresponding to the first time period and the second time period;
    determining, based on the ranking, that the first time period is ranked higher than the second time period; and
    causing the content item to be shared with the members in the member's connection network during the first time period.

2. The method of claim 1, wherein
    the first time period represents a time period when a largest portion of the members in the member's connection network are in a state of active engagement with the online social networking service.

3. The method of claim 2, wherein the first time period corresponds to a particular hour of the day.

4. The method of claim 2, wherein the state of active engagement corresponds to submitting at least one of a predetermined number of views, likes, shares, or comments on content items associated with the online social networking service.

5. The method of claim 1, further comprising:
    determining that the online social networking service includes a time-based content feed;
    determining, based on the ranking, that the second time period occurs after the first time period and is ranked higher than at least a third time period that also occurs after the first time period; and
    causing the content item to be shared to the members in the member's connection network during the second time period.

6. The method of claim 1, further comprising:
    determining that a plurality of members of the online social networking service are employees of a company and have submitted, during a predetermined time interval, requests to share the content item; and
    determining a set of staggered sharing times for causing the content item to be shared to the member in the member's connection network.

7. The method of claim 6, wherein there is at least a predetermined delay time interval between each of the staggered sharing times and another one of the staggered sharing times.

8. A system comprising:
    one or more computer processors; and
    one or more computer-readable mediums storing instructions that, when executed by the one or more computer processors, cause the system to perform operations comprising:
        receiving a request from a member of an online social networking service to share a content item among members in the member's connection network on the online social networking service;
        accessing member behavior log data associated with the members in the member's connection network:
        inferring, for one or more specific members in the member's connection network, based on a machine learning model, a likelihood of the respective specific member engaging with the content item during at least a first time period and a second time period, wherein the machine learning model is trained based on feature data derived from the member behavior log data, the feature data describing previous interactions by the members in the connection network with previously shared content items;
        for at least the first time period and the second time period, determining, based on the inferred likelihoods associated with the members in the connection network, a temporal engagement score associated with the given time period, the temporal engagement score indicating an inferred level of engagement with the content item by the members in the connection network during the corresponding time period;

ranking at least the first time period and the second time period based on the temporal engagement scores corresponding to the first time period and the second time period;

determining, based on the ranking, that the first time period is ranked higher than the second time period; and causing the content item to be shared with the members in the member's connection network during the first time period.

9. The system of claim 8, wherein the first time period represents a time period when a largest portion of the members in the member's connection network are in a state of active engagement with the online social networking service.

10. The system of claim 9, wherein the first time period corresponds to a particular hour of the day.

11. The system of claim 9, wherein the state of active engagement corresponds to submitting at least one of a predetermined number of views, likes, shares, or comments on content items associated with the online social networking service.

12. The system of claim 8, the operations further comprising:

determining that the online social networking service includes a time-based content feed;

determining, based on the ranking, that the second time period occurs after the first time period and is ranked higher than at least a third time period that also occurs after the first time period; and causing the content item to be shared to the members in the member's connection network during the second time period.

13. The system of claim 8, the operations further comprising:

determining that a plurality of members of the online social networking service are employees of a company and have submitted, during a predetermined time interval, requests to share the content item; and determining a set of staggered sharing times for causing the content item to be shared to the member in the member's connection network.

14. The system of claim 13, wherein there is at least a predetermined delay time interval between each of the staggered sharing times and another one of the staggered sharing times.

15. A non-transitory computer-readable medium storing instructions that, when executed by one or more computer processors of a computing device, cause the computing device to perform operations comprising:

receiving a request from a member of an online social networking service to share a content item among members in the member's connection network on the online social networking service;

accessing member behavior log data associated with the members in the member's connection network;

inferring, for one or more specific members in the member's connection network, based on a machine learning model, a likelihood of the respective specific member engaging with the content item during at least a first time period and a second time period, wherein the machine learning model is trained based on feature data derived from the member behavior log data, the feature data describing previous interactions by the members in the connection network with previously shared content items;

for at least the first time period and the second time period, determining, based on the inferred likelihoods associated with the members in the connection network, a temporal engagement score associated with the given time period, the temporal engagement score indicating an inferred level of engagement with the content item by the members in the connection network during the corresponding time period;

ranking at least the first time period and the second time period based on the temporal engagement scores corresponding to the first time period and the second time period;

determining, based on the ranking, that the first time period is ranked higher than the second time period; and causing the content item to be shared with the members in the member's connection network during the first time period.

16. The non-transitory computer-readable of claim 15, wherein the first time period represents a time period when a largest portion of the members in the member's connection network are in a state of active engagement with the online social networking service.

17. The non-transitory computer-readable of claim 16, wherein the first time period corresponds to a particular hour of the day.

18. The non-transitory computer-readable of claim 16, wherein the state of active engagement corresponds to submitting at least one of a predetermined number of views, likes, shares, or comments on content items associated with the online social networking service.

19. The non-transitory computer-readable of claim 15, the operations further comprising:

determining that the online social networking service includes a time-based content feed;

determining, based on the ranking, that the second time period occurs after the first time period and is ranked higher than at least a third time period that also occurs after the first time period; and causing the content item to be shared to the members in the member's connection network during the second time period.

20. The non-transitory computer-readable of claim 15, the operations further comprising:

determining that a plurality of members of the online social networking service are employees of a company and have submitted, during a predetermined time interval, requests to share the content item; and determining a set of staggered sharing times for causing the content item to be shared to the member in the member's connection network.

* * * * *

UNITED STATES PATENT AND TRADEMARK OFFICE
CERTIFICATE OF CORRECTION

PATENT NO. : 10,212,121 B2
APPLICATION NO. : 14/880917
DATED : February 19, 2019
INVENTOR(S) : Pan et al.

Page 1 of 1

It is certified that error appears in the above-identified patent and that said Letters Patent is hereby corrected as shown below:

In the Claims

In Column 16, Line 7, in Claim 2, after "wherein", delete "¶"

In Column 16, Line 52, in Claim 8, delete "network:" and insert --network;-- therefor In Column 18, Line 27, in Claim 16, after "computer-readable", insert --medium--

In Column 18, Line 32, in Claim 17, after "computer-readable", insert --medium--

In Column 18, Line 35, in Claim 18, after "computer-readable", insert --medium--

In Column 18, Line 41, in Claim 19, after "computer-readable", insert --medium--

In Column 18, Line 52, in Claim 20, after "computer-readable", insert --medium--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*